United States Patent [19]

Cinotti

[11] Patent Number: 4,724,946

[45] Date of Patent: Feb. 16, 1988

[54] ACCELERATION DEVICE TO DIVIDE ONE OR MORE CONTINUOUS ROWS OF PRODUCTS INTO EQUIDISTANT GROUPS OF ONE OR SEVERAL PRODUCTS

[75] Inventor: Andrea Cinotti, Bologna, Italy

[73] Assignee: Wrapmatic S.p.A., Lippo Di Calderara Di Reno, Italy

[21] Appl. No.: 850,560

[22] Filed: Apr. 11, 1986

[30] Foreign Application Priority Data

Apr. 12, 1985 [IT] Italy .................. 3400 A/85

[51] Int. Cl.⁴ ............................. B65G 47/26
[52] U.S. Cl. .................. 198/425; 198/460; 198/461
[58] Field of Search ........... 198/425, 460, 463.4, 198/454, 461, 462

[56] References Cited

U.S. PATENT DOCUMENTS

| | | | |
|---|---|---|---|
| 2,771,177 | 11/1956 | Cutter et al. | 198/425 |
| 2,878,919 | 3/1959 | Jones | 198/425 |
| 3,251,452 | 5/1966 | Conway et al. | 198/460 |
| 3,978,969 | 9/1976 | Williams et al. | 198/461 |
| 4,029,198 | 6/1977 | Lingl, Jr. | 198/460 X |
| 4,085,562 | 4/1978 | Finn et al. | 198/425 X |
| 4,360,098 | 11/1982 | Nordstrom | 198/425 X |
| 4,549,662 | 10/1985 | Schoenig, Jr. et al. | 198/425 |
| 4,638,903 | 1/1987 | Kimura | 198/429 X |
| 4,679,685 | 7/1987 | Inoko | 198/461 |
| 4,680,919 | 7/1987 | Hirama et al. | 198/425 X |

Primary Examiner—Joseph E. Valenza
Assistant Examiner—Jonathan D. Holmes
Attorney, Agent, or Firm—Browdy and Neimark

[57] ABSTRACT

For each continuous row of products (1), two accelerating belts (3, 4) acting continuously upon both sides of the respective continuous row of products (1). In a non-launching condition, the belts hold the products at a predetermined waiting position and, under launching conditions, launch a group of products (1) at the speed of a support conveyor belt (7) while bringing the following products in the continuous row to the waiting position. Preferably the accelerating belts (3, 4) are powered through DC servomotors with permanent rare-earth magnets.

12 Claims, 7 Drawing Figures

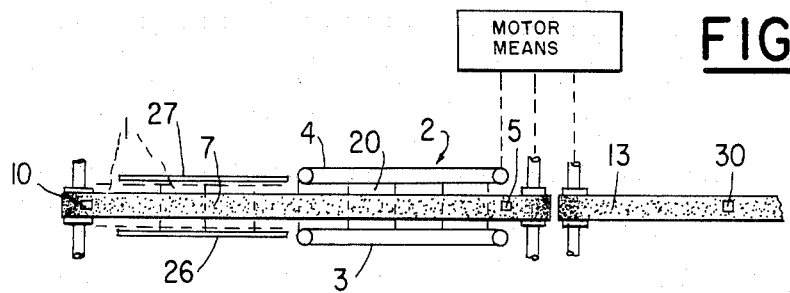
FIG. 1
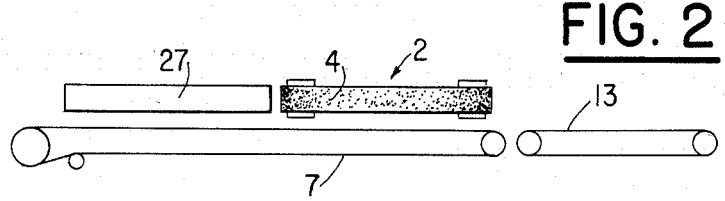
FIG. 2
FIG. 4
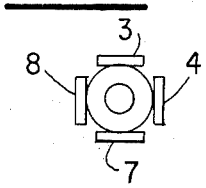
FIG. 3
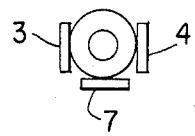
FIG. 5
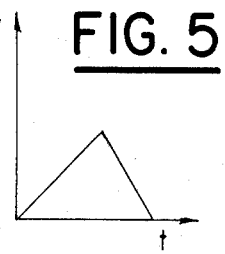
FIG. 6
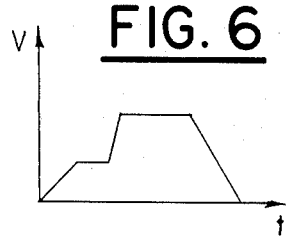
FIG. 7
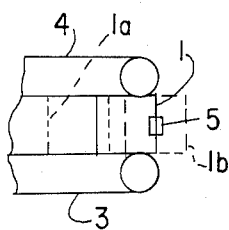

ACCELERATION DEVICE TO DIVIDE ONE OR MORE CONTINUOUS ROWS OF PRODUCTS INTO EQUIDISTANT GROUPS OF ONE OR SEVERAL PRODUCTS

FIELD OF THE INVENTION

The invention pertains to an acceleration device to divide one or more continuous rows of products into equidistant groups of one or several products.

BACKGROUND OF THE INVENTION

One of the most important problems to be solved in managing any production line is the achievement of the greatest possible result with a given operative configuration of the machines forming the line itself. That means the possibility of controlling the product flow during the whole process and the possibility of supplying the downstream machine with said products depending upon the working step and the production capacity of the machine itself.

Such a problem is for example to be solved between the machine or machines for the manufacture of any product and the machine or machines designed to wrap or pack it.

On coming out of the manufacturing machines, finished products are usually disposed according to one or more continuous rows whereas the wrapping machines need to receive the products individually spaced apart or in groups and fed at the same speed with which they come out of the manufacturing machine or machines.

For this purpose a device designed to space apart the products and to form different groups is usually provided between the manufacturing machines and the wrapping machines.

Most devices of this kind comprise a continuously moved conveyor, a pair of members adapted to intercept the first product of the continuous row, and gripping elements acting on the first product of the second group. Upon request of another group, downstream of this device, the intercepting members are deactivated; the group being free to move along the conveyor. Then the gripping elements too are deactivated and, after a certain lapse of time, necessary for the passage of a group of products, the intercepting members stop the first product of the second, now first, group. As a result, all of the continuous row is activated. Finally, the gripping elements too are activated again and they act now on the first product of the third, now second, group of the continuous row.

Other devices adopt solutions in which at regular intervals they act on the moving-forward products and impart a certain acceleration to the same so that they are spaced apart from the rest of the row.

In many cases said acceleration is imparted to the products by powered belt conveyors which at regular intervals are pressed against the products as they move forward.

However, as it is not possible to check the acceleration degree, in order to be sure that said products may at least receive a sufficient acceleration, it is necessary to impart to them the maximum acceleration possible, which causes the products to be ill-treated.

However sometimes a machine located upstream or downstream of this device may happen to be temporarily stopped for any reason, for example due to a clogging caused by the product or the paperboard or because it is necessary to change the wrapping band.

Should for example a manufacturing machine temporarily stop, the products could come to the acceleration device disposed in irregular groups and not on a continuous row, which would cause the wrapping machine to stop, that is, to wait for the regular feed of the products to be restored and this would be unproductive.

SUMMARY OF THE INVENTION

The object of the present invention is therefore to eliminate the above mentioned drawbacks. The invention, as defined in the claims, solves the problem of supplying an acceleration device adapted to divide one or more continuous rows of products into equidistant groups of one or several products that move forward at the same speed as the continuous rows.

The advantages achieved by the present invention consist essentially in that the continuous rows are uninterruptedly positively held at a predetermined waiting position by the launching means itself. This launching means, on receiving an appropriate signal from suitably arranged detecting means, launches a group of products, imparting to said products the necessary acceleration so that they may reach a speed identical with that of a conveyor belt supporting them, and brings the next products in the row to a waiting position, at which position they will remain waiting for another signal enabling a second group of products to be launched.

A further advantage of the device according to the present invention resides in that the products are not submitted to sudden accelerations that might damage them, due to the fact that they are submitted to an acceleration the speed of which is known and therefore suitably adjustable to the necessary value.

A still further advantage of the present invention, which can be attained above all when the launching means consists of two accelerating belts acting on two longitudinal facing sides of the continuous row of products, resides in that the continuous row is constantly compacted and the launching means is constantly in contact with the products holding them, so that at the moment they are launched you can be sure that all products forming the group are launched, and within the stated time. The certitude that the launched groups are always built up of the identical number of products also results from the presence of detecting means adapted to constantly detect whether the continuous row is provided at least with the number of products necessary to form a group.

Yet another advantage of the present invention is due to the fact that, by virtue of the presence of detecting means adapted to continuously check the operation of the different members of the device and of the presence of programmable means interlocked to the detecting means, it is possible to be sure of the perfect operation of the acceleration device even when the operation of the machines located upstream or downstream of the same is temporarily altered.

BRIEF DESCRIPTION OF THE DRAWINGS

The invention is described hereinafter in greater detail with reference to the accompanying drawings showing an embodiment of the same.

FIG. 1 is a diagrammatic plan view of the acceleration device according to the present invention.

FIG. 2 is a diagrammatic side view of the acceleration device shown in FIG. 1 with certain parts removed in order that others may be rendered more prominent.

FIG. 3 is a diagrammatic front view of the device seen in the preceding figures.

FIG. 4 is a front diagrammatic view of an alternative embodiment of the device seen in FIG. 3.

FIGS. 5 and 6 show a possible diagram of the acceleration and deceleration with velocity waveform ramps to which the groups consisting of a single product and of several products respectively are submitted in the device in reference.

FIG. 7 is a diagrammatic plan view of the first product of the continuous product row according to three possible positions thereof reached under the action of launching means of the device of the present invention, where the position shown with a solid line is the exact one and those shown in dotted lines are the inexact ones.

DESCRIPTION OF THE PREFERRED EMBODIMENT

Referring to FIGS. 1 to 3 and particularly to FIG. 1, it is possible to see that the acceleration device according to the present invention, to divide one or more continuous rows of products into groups of one or several products, essentially consists, for each continuous row of products fed in by one or more machines, of a conveyor belt 7 for supporting the respective continuous row of products 1 and of launching means 2.

A single conveyor belt 7 for a continuous row of products 1 is shown in FIG. 1 but it is apparent that any number of rows is possible without invalidating the inventive significance of the present acceleration device. Furthermore, in the following the terms "front" and "back" will always be used with respect to the feed direction of the products 1, which feed direction is from left to right looking at FIGS. 1 and 2.

The transport speed V of the conveyor belt 7 is identical with that provided for the continuous row of products 1 arriving at the accelerating device in question.

In the figures the launching means 2 is shown in the form of two accelerating endless belts 3 and 4 disposed along the feed direction of the respective continous product row 1.

The accelerating belts 3 and 4 are driven by respective motors (not shown) adapted to make the corresponding accelerating belts 3 and 4 move forward in a way concordant or discordant with the feed direction of the products 1. Said motors must also have a very short response time and the acceleration and deceleration impressed on the products 1 must always be programmable at will, these features being determinable, taking into account present techniques involving motors, for example in DC servomotors with permanent rare-earth magnets.

The accelerating belts 3 and 4 are both preferably disposed at right angles to the conveyor belt 7 (FIGS. 2 and 3) and slightly converging towards their front end. In this way each accelerating belt 3 in combination with the respective accelerating belt 4 forms a channel 20 defined at its lower part by the respective conveyor belt 7.

The accelerating belts 3 and 4 are spaced apart from each other by an amount substantially equal to the width of the products 1 so that they are able to hold the products 1 even in spite of the movement of the underlying conveyor belt 7.

Since the length of the conveyor belt 7 is greater than that of the accelerating belts 3 and 4, as shown in FIGS. 1 and 2, provision is made for the use of a pair of guide walls 26 and 27 substantially aligned with the accelerating belts 3 and 4 respectively.

As visible in FIG. 4, one of the accelerating belts, 3 or 4 (in the figure the accelerating belt 3), could be parallel, instead of at right angles, to the conveyor belt 7. In this case, opposition to the accelerating belt which has remained perpendicular to the conveyor belt 7, identified at 4 in FIG. 4, is made by means of a fixed reference plane 8, at right angles to the conveyor belt 7 as well.

The acceleration device according to the present invention also comprises detecting means 5, 30, 10 adapted to control the feed of the products 1. The above detecting means 5, 30, 10 and other detecting elements not shown lead off to programmable control means so that the acceleration device in question will be able to operate as hereinafter explained.

The first detecting means 5 acts within the channel 20, is located in the vicinity of the front end of the accelerating belts 3 and 4 and is adapted to directly control the motors of the accelerating belts 3 and 4 in order to cause the first product 1 in the continuous product row to be disposed so that its front edge is in vertical alignment with said accelerating belts (see in particular FIG. 7). If the first detecting means 5 detects that the first product 1, owing to the thrust produced by the continuous product row urging against it, has moved forward a little amount farther and has reached the position 1b (dashed line) in FIG. 7, it will actuate the motors of the accelerating belts 3 and 4 so that the whole continuous row of products 1 will be caused to move back. On the contrary, if the continuous row of products 1 has occupied a backward position, such as for example the position 1a (dotted line) in FIG. 7, it acts on the motors of the accelerating belts 3 and 4 so as to cause the continuous row of products 1 to move forward a little. For the above reason and above all in order to obtain a perfect launching of the products 1, it is necessary that the motors of the accelerating belts 3 and 4 have a very short response time so that the greatest effectiveness of the acceleration device in reference may be achieved.

The second detecting means 30 is located downstream of the conveyor belt 7 and is adapted to detect the front of the group of products 1 launched by the accelerating belts 3 and 4 and to interrupt the launching operation of the latter. As a matter of fact, it is intended to detect when the accelerating belts 3 and 4 have launched a complete group of products 1. The position of the second detecting means 30 is adjustable along the longitudinal direction of the conveyor belt 7 depending upon the number of products 1 forming each product group. Assuming that said product groups consist of three products 1 and that the second detecting means 30 is disposed at a distance from the first detecting means 5 which is slightly greater than three times the length of a product 1, when the second detecting means 30 is actuated by the front of the group of products 1 launched by the accelerating belts 3 and 4 and has stopped the operation of said accelerating belts, it has exactly launched a group of products 1 as requested.

The third detecting means 10 acts again within the channel 20 and is located in such a position that it can detect whether between the accelerating belts 3 and 4, or or in any case in the launching area, at least a complete group of products 1 ready to be launched is present.

In FIGS. 1 and 2 is shown a conveyor belt 13 aligned with the conveyor belt 7 and to which groups of products 1 are fed from the accelerating device in reference.

When the whole line, of which the accelerating device in reference is part, is operating, the first detecting means 5 acts on the motors of the accelerating belts 3 and 4 in order to maintain the front of the continuous row of products 1 vertically aligned with the first detecting means 5 itself as explained above. Upon request of a group of products 1 by the machine located downstream of the device in question, enablement of the launching is provided by the third detecting means 10, if it detects the presence of at least a group of products 1 between the accelerating belts 3 and 4 or in any case in the launching area. At this point the motors of the accelerating belts 3 and 4 are actuated until said accelerating belts 3 and 4 reach the speed V which is the advance speed of the conveyor belt 7. Said speed V can be reached through a single ramp waveform for the velocity, above all in the case of groups consisting of a single product 1 (see FIG. 5), or through two velocity waveform ramps having different inclinations and separated by a short portion having a constant speed, when groups of several products 1 are concerned (see FIG. 6). In the latter case, the first ramp should have a lower inclination than the second one in order to allow the launching of the first product 1 of the first continuous row and a better holding of the following products 1 by the accelerating belts 3 and 4. Once they have reached the speed V the accelerating belts 3 and 4 are maintained at this speed V for a certain time depending upon the number of products 1 to be launched, in order to bring the products 1 following those launched to the waiting position defined by the first detecting means 5. Then they are decelerated through a velocity ramp having an inclination different from the velocity ramp or ramps for the acceleration (see FIGS. 5 and 6). Afterwards a group of products 1 for each continuous product row is launched onto the conveyor belt 13, i.e. it is accelerated up to the achievement of the speed V of the conveyor belts 7 and 13, and simultaneously the products 1 of the continuous row following those launched are first accelerated like the first ones, then decelerated and stopped at a waiting position by the accelerating belts 3 and 4. At this point the acceleration device in reference is ready to repeat the above described cycle.

The invention as envisaged is susceptible of many modifications and variations, all falling within the scope of the inventive idea. Furthermore, all details can be replaced by technically equivalent elements.

What is claimed is:

1. An accelerating device to divide one continuous row of products into equidistant groups of at least one of said products in each group, comprising
    a conveyor belt on which said continuous product row is provided, said conveyor belt being continuously fed at a first feeding speed in a feed direction,
    launching means for accelerating and decelerating said products, for providing a non-launching condition in which a first of said products of said continuous row is held in a predetermined waiting position with zero velocity, and for providing a launching condition in which each one of said groups is launched with at least one of said products thereof being at said first feeding speed,
    first detecting means for detecting the position of said first of said products and acting on said launching means to maintain said first of said products of each said group at said waiting position in said non-launching condition, and
    second detecting means provided downstream of said first detecting means with respect to said feed direction, at a distance equal to the length of the groups, for stopping the launching by said launching means according to each said group.

2. The device of claim 1, wherein said launching means comprises two accelerating belts bilaterally disposed with respect to said conveyor belt and spaced apart from each other at a distance to press at least the first product of each said group, and a motor for driving said accelerating belts to provide said acceleration and deceleration of said products.

3. The device of claim 2, comprising a third detecting means located upstream of said launching means with respect to said feed direction, for determining during each said non-launching condition when a number of said products being held in the non-launching condition is equal to the number thereof in each said group, for changing over from said non-launching condition to said launching condition.

4. The device of claim 3, said launching means comprising a pair of further belts arranged approximately in parallel with a part of said conveyor belt and adjacent thereto.

5. The device of claim 4, comprising a pair of guidewalls adjacent a further part of said conveyor belt upstream of said further belts of said launching means and downstream of said third detecting means.

6. The device of claim 1, wherein said launching means comprises at least two accelerating belts angularly disposed with respect to each other in at least one vertical reference plane perpendicular to said conveyor belt, and a motor for driving said accelerating belts for providing said acceleration and deceleration of said products.

7. The device of claim 1, wherein the absolute values of said acceleration and deceleration are different.

8. The device of claim 1, wherein each said group comprises a plurality of said products, and the acceleration of said products for said launching is divided into two phases separated by a phase at constant speed.

9. The device of claim 8, wherein the acceleration values of said two accelerating phases are different, with the second being greater than the first.

10. The device of claim 9, comprising a third detecting means located upstream of said launching means with respect to said feed direction, for determining during each said non-launching condition when a number of said products being held in the non-launching condition is equal to the number thereof in each said group, for changing over from said non-launching condition to said launching condition.

11. The device of claim 10, wherein the first of said products in said group is launched at a lower speed than each subsequent one of the group.

12. The device of claim 1, said launching means comprising a pair of further belts arranged approximately in parallel with a part of said conveyor belt and adjacent thereto.

* * * * *